United States Patent
Cowie

(10) Patent No.: US 9,016,325 B2
(45) Date of Patent: Apr. 28, 2015

(54) SALT GUARD

(71) Applicant: Dale R. Cowie, Ft. Walton Beach, FL (US)

(72) Inventor: Dale R. Cowie, Ft. Walton Beach, FL (US)

(73) Assignee: Dale R. Cowie, Fort Walton Beach, FL (US)

( * ) Notice: Subject to any disclaimer, the term of this patent is extended or adjusted under 35 U.S.C. 154(b) by 0 days.

(21) Appl. No.: 13/914,699

(22) Filed: Jun. 11, 2013

(65) Prior Publication Data

US 2014/0360612 A1  Dec. 11, 2014

(51) Int. Cl.
*F16L 9/14* (2006.01)
*F16L 58/00* (2006.01)

(52) U.S. Cl.
CPC ...................................... *F16L 58/00* (2013.01)

(58) Field of Classification Search
USPC .................. 138/141, 137, 145; 239/572, 570; 169/37
See application file for complete search history.

(56) References Cited

U.S. PATENT DOCUMENTS

| | | | | |
|---|---|---|---|---|
| 6,129,999 | A * | 10/2000 | Ueda et al. | 428/683 |
| 6,276,401 | B1 * | 8/2001 | Wilson | 138/172 |
| 6,279,617 | B1 * | 8/2001 | Havn | 138/155 |
| 7,588,058 | B2 * | 9/2009 | McKeen et al. | 138/137 |
| 7,784,498 | B2 * | 8/2010 | Dupoiron et al. | 138/137 |
| 7,798,431 | B2 * | 9/2010 | Eader | 239/572 |
| 7,819,140 | B2 * | 10/2010 | Bass et al. | 138/145 |
| 7,870,877 | B2 * | 1/2011 | McKeen et al. | 138/137 |
| 2008/0308285 | A1 * | 12/2008 | Su et al. | 169/37 |

\* cited by examiner

*Primary Examiner* — Patrick F Brinson

(57) ABSTRACT

Corrosion of the steel components used in fire sprinkler systems that are exposed to salt air along seawater coastlines leads to costly repairs or the possible catastrophic failure of a life safety fire sprinkler system. Salt Guard provides a unique, specific, and particular method to protect steel piping using a combination of materials that are readily available on the market. The National Fire Protection Association #13, Standard for the Installation of Sprinkler Systems, does not define a method for "Protection of Piping Against Corrosion", although the Standard requires it. Salt Guard improves on that Standard by defining a particular combination of materials to be used and a method for application of those materials to achieve the required corrosion protection and additionally provide corrosion prevention for the owner.

4 Claims, No Drawings

SALT GUARD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

The atmosphere of air containing salt in saltwater coastal communities is particularly conducive to promoting and accelerating corrosion of exposed steel used in the piping of fire sprinkler systems, as well as various elements used in fire sprinkler heads during manufacture. The atmosphere creates a specific corrosion problem for exposed steel fire sprinkler systems.

National Fire Protection Association #13, Standard For The Installation of Sprinkler Systems, states, "Where corrosive conditions exist or piping is exposed to weather, corrosion-resistant types of pipe, fittings, and hangers or protective corrosion-resistant coatings shall be used."

Typical fire sprinkler installations, such as ones that exist in outdoor parking garages in coastal communities, are extremely subject to corrosion. In order to meet the N.F.P.A #13 requirements as stated in the above paragraph [0002], standard industry practice is the use of hot-dipped galvanized pipe, fittings, and hangers in installation of fire sprinkler systems exposed to corrosion. Hanger rod is typically zinc plated all-thread rod. Occasionally, the hanger rings supporting the pipe are stainless steel, but usually they are simply galvanized. Fire sprinkler heads are usually painted polyester or Teflon coated for corrosion resistance by the manufacturer. But, severe corrosion occurs anyway, mostly due to fabrication techniques as described below, and the corrosion resistance fails in application.

Fire sprinkler systems are typically pre-fabricated. The sprinkler system is defined as a combination of "mains" and "branch lines", similar to a tree where the trunk is the "main" and the branches are "branch lines".

Fabrication of fire sprinkler mains involves the use of full lengths of sprinkler mainpipe (21 ft, or 25 ft.) and attaching outlets to the pipe for branch lines. The size of pipe used in sprinkler mains ranges from 2-inch through 8-inch, sized hydraulically using calculations. The outlets are made by cutting a hole in the pipe, and the use of hot-dipped galvanized outlets (threaded or grooved), welded to the pipe. Fabricated branch lines are either full lengths of pipe with welded outlets as described above for the sprinkler heads, or cut to length threaded branch lines with hot-dipped threaded galvanized fittings for the sprinkler head outlets.

The action of welding the outlets to pipe—either main or branch line, burns away the galvanization of the pipe and outlet. The action of threading the branch line pipe for screwed on galvanized fittings cuts away the galvanic layer of the pipe. In both instances with galvanization removed, the pipe or welded outlet becomes unprotected black steel, and extremely vulnerable to corrosion. The connections become the weak areas in the tire sprinkler systems, making them subject to failure which could be catastrophic. The repair of corroded pipe and outlets usually results in replacement of the entire section (full length) of pipe.

Stainless steel hanger rings furnish superior corrosion resistance, but when attached to the hot-dipped galvanized sprinkler piping, electrolysis (galvanic corrosion takes place as stainless steel rings and hot dipped galvanized steel pipe are dissimilar materials. The resulting corrosion takes place on the piping making it subject to failure. Also, typical zinc plated hanger rods corrode and can no longer support the weight of water filled pipe.

The industry standard of using polyester coated, or Teflon coated fire sprinklers meets the criteria of being corrosion-resistant, but corrosion occurs anyway, making the fire sprinkler heads subject to failure.

BRIEF SUMMARY OF THE INVENTION

The present invention resolves conventional piping corrosion issues through the use of hot-dipped galvanized mechanical type outlets, and eliminates the use of welded outlets on sprinkler pipe. On threaded branch lines, protect the exposed steel that has been cut away during the threading process.

Insulate stainless steel hanger rings from making contact with the galvanized steel piping.

Use stainless steel hanger rods in lieu of zinc plated steel hanger rods.

Use Nickel-Teflon (or equal) coated fire sprinkler heads that provide superior corrosion resistance as opposed to the use of polyester or Teflon coated fire sprinkler heads.

BRIEF DESCRIPTION OF THE SEVERAL VIEWS OF THE DRAWING

Not Applicable.

DETAILED DESCRIPTION OF THE INVENTION

This invention is a unique and specific method for fabrication or repair of fire sprinkler systems installed in corrosive atmospheres. Using modern materials, this method is a superior improvement or replacement of the old industry standard practices as described in the above Background of Invention.

In the body of the text descriptions, there will be reference to "corrosive protective coating". Protective coatings are either synthetic rubberized or plasticized coatings that are currently available on the market.

Outlets installed on fire sprinkler piping: In lieu of welded outlets that burn away galvanization, use UL/FM hot-dipped galvanized mechanical tees or crosses similar to Victaulic Corporation Style 920 or 922. The mechanical outlets are bolt-on, similar to what is commonly known as a "saddle". To install the outlet, drill the appropriate sized hole in the sprinkler piping and de-burr. Fit the mechanical outlet or collar, and gasket in place and tighten the bolts. The pressure responsive gasket seals the collar in place. The bolts are made of heat treated nickel plated carbon steel. Coat the bolts and nuts with a corrosive protective coating after installation. Repeat the above process for any outlet. This results in no exposed unprotected steel to the salt air atmosphere. Although protected, should the bolts or nuts become corroded in the future, only the bolts and nuts would need replacement, not the entire pipe, or outlet.

Threaded Fire Sprinkler Pipe: During the action of threading galvanized pipe for screwed fittings, the pipe steel is cut using a die for the threads. In the process, galvanization is cut away. In this instance, coat all exposed threads with a corrosion protective coating once the pipe is installed. This results in no exposed unprotected steel to the salt air atmosphere.

Stainless Steel Hanger Rings: Where attached to the galvanized fire sprinkler piping, insulate between the hanger ring and pipe with very thin PVC material so as to not interfere with the required sloping of the pipe (if required). The resulting coating will insulate the stainless steel from the galvanized pipe thus preventing electrolysis.

Hanger rods: Hanger rods are attached to the building structure and they extend down to the hanger ring supporting the sprinkler piping. Use stainless steel hanger rods in lieu of zinc plated steel that ultimately corrodes and fails to adequately support the piping. Stainless steel hanger rods will not corrode.

Fire Sprinkler Heads: In lieu of using standard polyester or Teflon coated fire sprinkler heads, use state of the art Nickel-Teflon® (or similar) coated fire sprinkler heads that have superior corrosion resistance to salt air.

The invention claimed is:

1. A method for corrosion protection of galvanized steel piping used in fire sprinkler systems and fire sprinklers that are exposed to corrosive environments or atmospheres comprising the steps of:
   a) installing hot-dipped galvanized mechanical type sprinkler outlets, having outlet bolts and nuts, on the piping and
   b) applying a rubberized liquid coating to the mechanical type outlet bolts and nuts after installation.

2. The method of claim 1, further including the step of applying a rubberized liquid coating to exposed threads of the galvanized piping, the threads having been exposed to the corrosive environments by a die cutting process.

3. The method of claim 1, wherein said fire sprinklers comprise Nickel-Teflon® corrosion resistant coated sprinkler heads.

4. The method of claim 1, further including the steps of providing stainless steel sprinkler pipe hanger rings and stainless steel hanger rods to support the piping, wherein PVC insulation is installed between said stainless steel hanger rings and said galvanized sprinkler piping to prevent electrolysis type galvanic corrosion.

* * * * *